Figure 1:
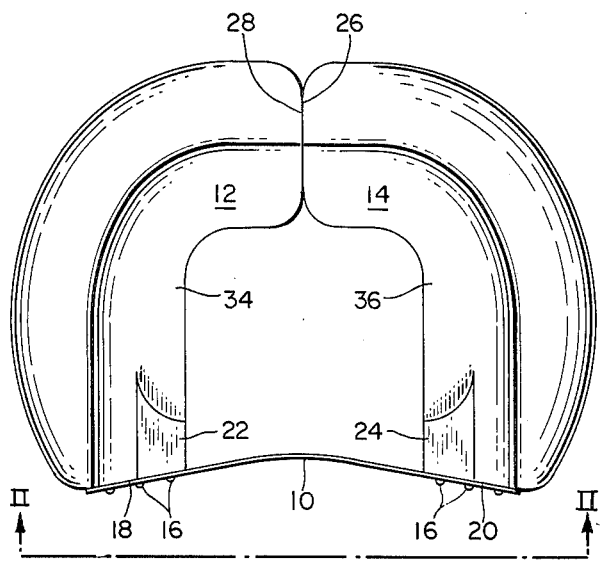

June 28, 1966 W. D. BOWEN 3,258,088

SPRING ACTION WHEEL CHOCK

Filed May 27, 1963

INVENTOR.
WILLIAM D. BOWEN
BY Ervin F. Johnston
George G. Rubens
ATTORNEYS 3,258,088
SPRING ACTION WHEEL CHOCK
William D. Bowen, 12361 Chase St., Garden Grove, Calif.
Filed May 27, 1963, Ser. No. 283,640
4 Claims. (Cl. 188—32)

The invention described herein may be manufactured and used by or for the Government of the United States of America for governmental purposes without the payment of any royalties thereon or therefor.

The present invention relates to a spring action wheel chock and more particularly to a self-wedging chock which is simple of construction, easy to operate and adaptable to various sizes of tires.

The problem in the present state of the art is manifested especially when one considers the chocks now employed for aircraft board aircraft carriers. This type of chock utilizes two blocks, one of which is slidable on a rod and has a ratchet latch mechanism which engages the rod for positioning the block therealong. One problem is that there is never any assurance that the blocks are snugly engaging the wheel periphery since there is no means for biasing either of the blocks toward the wheel. With a pitching motion of the carrier the aircraft will rock back and forth against the blocks causing the chock to have a tendency to slide in a transverse direction from the wheel when the carrier undergoes a rolling motion. Instances have occurred where this type of chock has slid away from the wheel endangering the aircraft to rolling over the side of the carrier. Further, the back and forth motion of the tire on the blocks causes a considerable amount of wear to the ratchet latch mechanism which will eventually cause its failure. A failure of the ratchet latch mechanism would of course again allow the chock to slide away from the wheel. Other chocks have employed springs to bias the blocks toward one an other, however, their construction is complex and costly, they are difficult to operate and some are not reliable. The present invention overcomes these problems by providing a chock which will not slide away from the wheel, which is simple of construction and is easy to operate. This is accomplished by attaching a pair of curved wedge shaped blocks to an elongate leaf type of spring. The blocks curve toward one an other and upon flexing the spring can be spread apart to engage various sizes of the wheels. The curve shape of the blocks serves a double function of surrounding smaller wheels (when the spring tension is weaker) to prevent sideways motion and also to present good wedging surfaces against the wheel when the blocks are spread to engage the larger type of wheels. The present invention is very simple of construction since all that is required are the two blocks and the flat spring plus means for connecting the blocks to the spring. The present invention is very simple of operation in that the blocks are spread apart by hand to surround the wheel and then merely released causing the blocks to snap against the periphery of the wheel and snugly engage it at all times. The chock is released simply by kicking the chock in the vicinity of the spring which releases the tight biasing effect due to the wedging action upon motion of the wheel, after which the chock can be spread apart and pulled away from the wheel.

An object of the present invention is to provide a wheel chock which is simple of construction and easy to operate.

Another object is to provide a wheel chock which will accommodate various sizes of wheels and which is easy to operate.

A further object is to provide a wheel chock which will not slide laterally away from a wheel upon rocking motion of the wheel.

A still further object is to provide a wheel chock which will have a longer useful life.

Yet another object is to utilize the inherent characteristics of a flat spring for providing a wheel chock which will maintain a continuous wedging action against various sizes of wheels.

Figure 2:
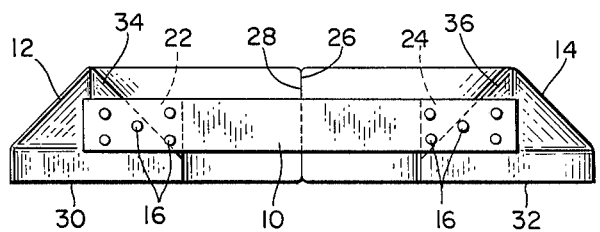
Figure 3:
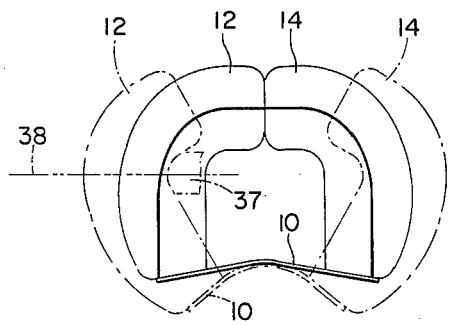
Figure 4:
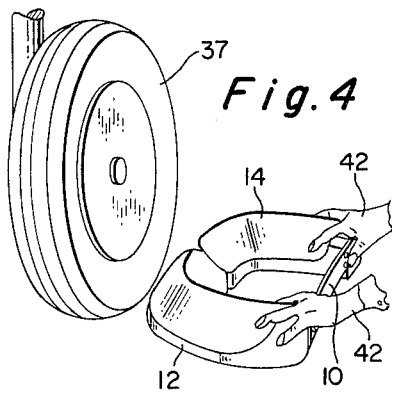
Figure 5:
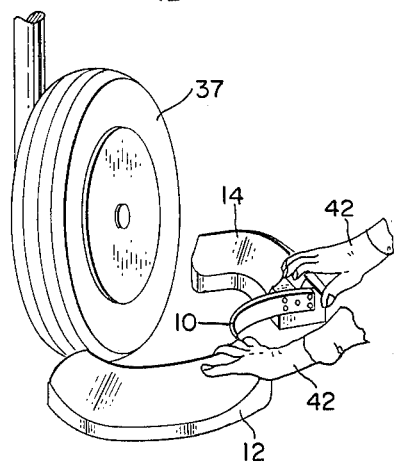
Figure 6:
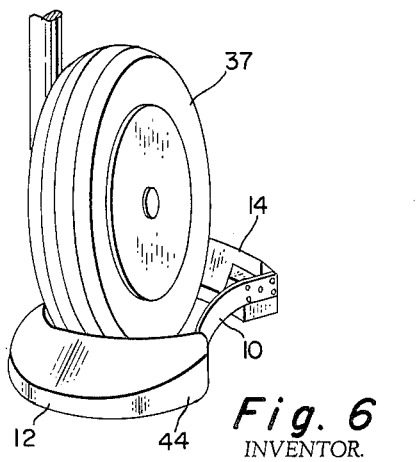

Other objects and many attendant advantages of this invention will be readily appreciated as the same becomes better understood by reference to the following detailed description when considered in connection with the accompanying drawing in which like reference numerals designate like parts throughout the figures thereof and wherein:

FIG. 1 is a plan view of the wheel chock;
FIG. 2 is a view taken along line 2—2 of FIG. 1;
FIG. 3 is a plan view of the wheel chock shown in various positions;
FIG. 4 is an isometric view of the wheel chock being readied for wedging action against a wheel;
FIG. 5 is an isometric view of the wheel chock being opened for wedging against a wheel;
FIG. 6 is an isometric view of the wheel chock wedging the wheel and holding it in place.

Referring now to the drawing, wherein like reference numerals designate like or corresponding parts throughout the several views, there is shown in FIG. 1 a wheel chock having an elongate flat spring 10 which is capable of flexing in the plane of the sheet of the drawing. A pair of blocks 12 and 14 which are complementary and symmetrical with respect to one an other are rigidly attached to the spring 10 by bolts 16 so as to be capable of movement in a respective arcuate path lying within said plane. The blocks 12 and 14 have ends 18 and 20 respectively and bosses 22 and 24 adjacent said ends which are threaded for receiving the bolts 16 and providing a good connection. In the preferred embodiment the spring 10 before attachment to blocks 12 and 14 will be straight and flat. The ends 18 and 20 of the blocks are beveled so that upon attachment to the spring 10 the spring is flexed to the bowed position shown in FIG. 1 causing the ends 26 and 28 to be biased toward one another. This will cause the chock to be a tight piece of gear when not in use.

The blocks 12 and 14 have flat bottoms 30 and 32, respectively, which lie in a plane substantially perpendicular to the plane of the sheet of the drawing. The blocks 12 and 14 further have wedge shaped sides 34 and 36 which extend from the spring 10 substantially parallel to one another for a distance and thereafter curve toward one another until the ends 26 and 28 come into engagement. The distance that the wedge shaped sides 34 and 36 extend from the spring 10 will, of course, depend upon the range of widths of wheels that are involved which engage both sides 34 and 36 when the ends 26 and 28 are in or near engagement. The shape taken by the sides 34 and 36 in conjunction with the spring 10 will form an enclosure as shown in FIG. 1 when the blocks 12 and 14 are not spread apart. When the blocks 12 and 14 are spread apart to a predetermined position as shown in FIG. 3 the curve of the wedge shaped sides 34 and 36 is to be such that the pressure across the track of a wheel 37 presents a substantially symmetrical pattern for any particular shaped wheel. Accordingly, if a line 38, as shown in FIG. 3, is considered to be the center line of the track of the wheel 37 the block 12 will engage the periphery of the wheel with a symmetrical pattern of pressures on both sides of the line 38. The block 14 will engage the other side of the wheel in the same manner.

The blocks 12 and 14 may be made of any suitable material such as hollow plastic bodies, wood, or sheet metal. The bottoms 30 and 32 may be roughened or provided with a rubber base coating so as to prevent any slipping of the chock while in engagement with a wheel.

The chock is, of course, designed for a particular range of sizes of wheels, however, this range is quite large because of the great spread that can be attained between the blocks 12 and 14, as shown in FIG. 3. Means other than the bolts 16 can be used to attach the spring 10 to the blocks 12 and 14 and it would even be possible to construct the entire chock in one piece out of plastic with a springy band of plastic serving the function of spring 10. The chock could be easily modified by hinging the two blocks together for movement toward and away from one another with a compression spring or loop spring attached to the hinge for biasing the blocks toward one another.

In the operation of the device an operator uses his hands 42 to position the chock at the side of the wheel 37 as shown in FIG. 4. The operator will then spread the blocks 12 and 14 apart, as shown in FIG. 5, and move the chock toward the wheel 37. The operator then releases the blocks 12 and 14 when the chock is under the wheel, after which the blocks 12 and 14 will snugly engage the periphery of the wheel as shown in FIG. 6. For larger wheels the operator should adjust the chock until the curve portion of the wedge shaped sides 34 and 36 provide a symmetrical pattern of pressure across each side of the track of the wheel as explained above. It is to be noted that the chock will be continuously biased toward the periphery of the wheel and as the wheel makes a rocking motion the chock will at all times provide a continuous wedging action to keep the wheel in place. Further, the friction caused by the wedging action against the wheel as well as the portion of the blocks 12 and 14 which surround the wheel will prevent the chock from sliding laterally away from the wheel. When it is desired to release the chock from the wheel the operator need merely kick one of the blocks 12 or 14 in the vicinity of the spring 10 such as at area 44 which will break the wedging action against the wheel, thus allowing the operator to spread the blocks 12 and 14 apart to withdraw the chock from the wheel.

It is now readily apparent that the present invention provides a simply constructed chock which is easy to operate when used in conjunction with a particular range of sizes of tires. Because of the construction of the chock it will promote safety especially for aircraft aboard carriers by insuring that there is no disengagement by transverse movement of the chock away from the wheel.

Obviously many modifications and variations of the present invention are possible in the light of the above teachings. It is therefore to be understood, that within the scope of the appended claims, the invention may be practiced otherwise than as specifically described.

I claim:
1. A three-piece wheel chock comprising:
   a pair of blocks each having a recessed portion to engage various sizes of wheels; and
   a resilient structural member interconnecting said blocks and rigidly attached thereto so as to form an integral unit therewith;
   said resilient member urging said blocks together at points remote from the points of attachment of the structural member;
   whereby said blocks can be spread apart to accommodate various sizes of wheels by selectively flexing said resilient member and said blocks will be biased against a wheel upon release of the spreading pressure.
2. The device as defined in claim 1 wherein said resilient member is substantially straight when the chock is in the operative condition.
3. The device as defined in claim 2 wherein said resilient member is of leaf spring material which before being connected to the blocks is substantially flat.
4. The device as defined in claim 2 wherein said blocks have a substantially straight bottom side and wedge shaped interior portions facing one another.

References Cited by the Examiner
UNITED STATES PATENTS

| | | | |
|---|---|---|---|
| 2,850,117 | 9/1958 | Gersmehl | 188—32 |
| 3,026,973 | 3/1962 | Piel | 188—32 |

DUANE A. REGER, *Primary Examiner.*

ARTHUR L. LA POINT, FERGUS S. MIDDLETON, *Examiners.*